United States Patent [19]

Chasseguet et al.

[11] Patent Number: 4,767,380
[45] Date of Patent: Aug. 30, 1988

[54] DAMPER-TYPE FLYWHEEL SUITABLE FOR AUTOMOBILE TRANSMISSIONS

[75] Inventors: Gustave Chasseguet, Taverny; Jacques Paquin, Villeneuve La Garenne, both of France

[73] Assignee: Valeo, Paris, France

[21] Appl. No.: 10,727

[22] Filed: Feb. 4, 1987

[30] Foreign Application Priority Data

Feb. 5, 1986 [FR] France ................................. 86 01560

[51] Int. Cl.$^4$ .............................................. F16D 3/12
[52] U.S. Cl. ........................................ 464/68; 74/574; 464/66
[58] Field of Search ........................ 74/574; 192/106.2; 464/64, 66, 67, 68

[56] References Cited

U.S. PATENT DOCUMENTS

| 4,222,476 | 9/1980 | LeBrise ............................. 192/106.2 |
| 4,663,983 | 5/1987 | Kobayashi et al. ................ 464/68 X |

FOREIGN PATENT DOCUMENTS

| 2931423 | 2/1980 | Fed. Rep. of Germany ... 192/106.2 |
| 2151332 | 7/1985 | United Kingdom . |
| 2153970 | 8/1985 | United Kingdom ............. 192/106.2 |

Primary Examiner—Daniel P. Stodola
Attorney, Agent, or Firm—Charles E. Brown; Charles A. Brown

[57] ABSTRACT

A damper-type flywheel comprises coaxial first and second flywheel parts which rotate relative to each other. There are two spaced annular flanges on the first flywheel part and an annular flange assembly on the second flywheel part which lies between the annular flanges on the first part. Circumferentially acting spring members and a friction device are operative between the first and second flywheel parts. The friction device comprises an annular flange constrained to rotate with the flange assembly, at least one friction ring disposed axially between the annular collar and the flange assembly, and lost-motion circumferential engaging portions operative between the friction ring or rings and one of the annular flanges on the first flywheel part.

11 Claims, 2 Drawing Sheets

DAMPER-TYPE FLYWHEEL SUITABLE FOR AUTOMOBILE TRANSMISSIONS

BACKGROUND OF THE INVENTION

1. Field of the Invention

The present invention concerns flywheels for transmission systems, of the kind usually constituting an inertial member in clutches, especially clutches designed to be fitted to automobile vehicles.

It is more particularly directed to flywheels, known as damper-type flywheels, incorporating damper means operative against possible torsional torques.

2. Description of the Prior Art

It is usual to incorporate a torsional damper device in a transmission system to filter out vibration that can arise anywhere in the kinematic system that the transmission constitutes, extending from the motor to the wheel axles in the case of an automobile vehicle.

The torsional damper device is usually incorporated in the friction disk of the clutch.

However, it has also been proposed to incorporate a torsional damper device in the flywheel, either instead of or in conjunction with the damper device in the friction disk, for certain applications of a specific kind, in particular for vehicles where the motor develops a relatively high torque at low rotation speeds, where there may be a particular requirement to eliminate "trash" noise which occurs under load.

This is the case, for example, with the damper-type flywheel that is the subject matter of German patent No. 29 31 423.

Generally speaking, a damper-type flywheel of this kind comprises two coaxial parts disposed to rotate relative to each other, namely a first part comprising two spaced annular flanges and a second part comprising an annular flange assembly adapted to lie between the annular flanges on the first part, and circumferentially acting spring means and friction means operative between the first and second parts, the circumferentially acting spring means in practise comprising circumferentially acting spring members accommodated in respective openings provided for them in the annular flanges, arms forming part of the flange assembly being adapted to interfere with these spring members, with circumferential clearance between the spring members and the arms.

In the proposed embodiments the friction means are in practise of two types.

Firstly there are friction means which are operative from the beginning of and throughout relative angular displacement between the two coaxial parts concerned and which are the only means operative between the coaxial parts during a first part of their relative angular displacement, the spring members provided between these coaxial parts only becoming operative during a second portion of this movement.

Secondly there are friction means associated with a much higher torque than the relatively moderate torque associated with the previously described friction means and which, being operative in practise in series with the other component parts of the damper-type flywheel, constitute a torque limiter the function of which is, by introducing slippage, to absorb any excess torque that may arise because of resonance between the two coaxial parts concerned on relative oscillation between them, especially on starting up and stopping.

A particular disadvantage of a torque limiter of this kind is that it has to correspond to a torque greater than the motor torque and may lead to malfunctions should it be damaged since, being operative in series with the other components, the torque to be transmitted has to pass through it.

A general objective of the present invention is an arrangement which is advantageously free of such disadvantages whilst providing for absorption of any excess torque.

SUMMARY OF THE INVENTION

The present invention consists in a damper-type flywheel comprising coaxial first and second parts adapted to rotate relative to each other, two spaced annular flanges on said first part, an annular flange assembly on said second part adapted to lie between said annular flanges on said first part, and circumferentially acting spring means and friction means operative between said first and second parts, said friction means comprising an annular flange constrained to rotate with said flange assembly, at least one friction ring disposed axially between said annular collar and said flange assembly and lost-motion circumferential engagement means operative between said friction ring and one of said annular flanges of said first part.

Thus these friction means are systematically operative during relative angular displacement between the two coaxial parts concerned beyond a particular value of this relative angular displacement and, although the corresponding torque is advantageously set at a value lower than the motor torque, they are able to absorb any excess torque by virtue of them being operative not in series with the other component parts of the damper-type flywheel, and in particular the circumferentially acting spring members operative between the two coaxial parts, but rather in parallel therewith.

As the torque to be transmitted thus no longer passes through the friction means, operation is not seriously compromised should they suffer any form of deterioration.

Thus operation of the flywheel is advantageously made more secure.

The characteristics and advantages of the invention will emerge from the following description given by way of example with reference to the appended schematic drawings.

DESCRIPTION OF THE PREFERRED EMBODIMENT

As shown in the figures, the damper-type flywheel in accordance with the invention generally comprises two coaxial parts A and B rotatable relative to each other.

Figure 2:
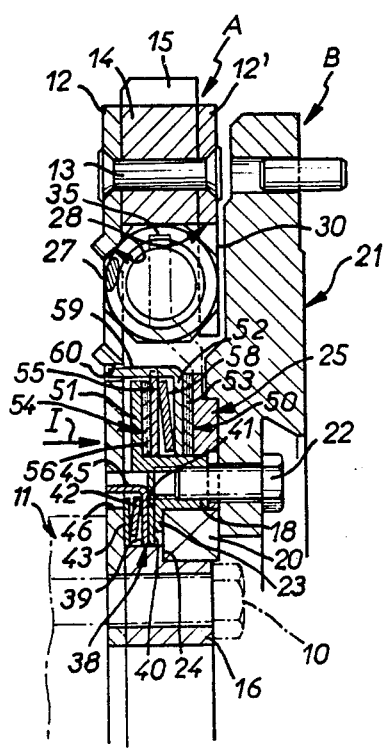
FIG. 2 is a partial view of it in axial cross-section on the line II—II in FIG. 1.
Figure 3:
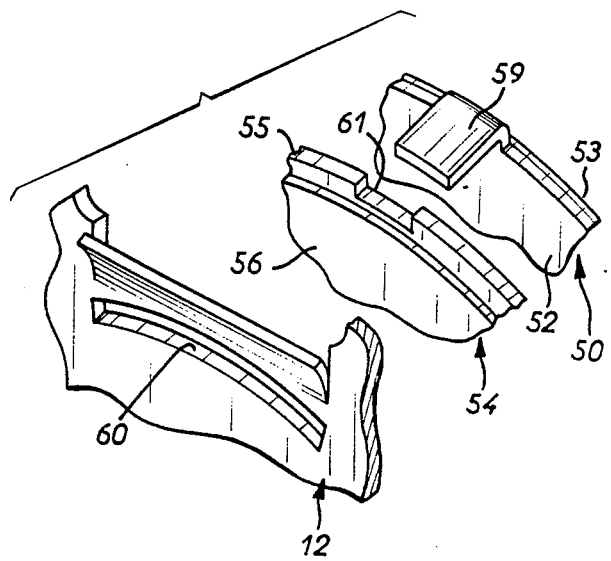
FIG. 3 is a partial exploded view in perspective of certain component parts of the damper-type flywheel.

The part A, or input part, is designed to be attached by screws 10, schematically represented in chain-dotted outline in FIG. 2, to a shaft 11, which is a driving shaft such as, for example, the output shaft or crankshaft of the motor in the case of an automobile vehicle.

This part A comprises two spaced annular flanges 12 and 12'.

The outside or largest diameter edges of the flanges 12, 12' have substantially the same radius and the flanges are fastened together by means of rivets 13 with an annular spacer 14 inserted between them.

This annular spacer 14 has teeth 15 at its outside edge and thus of itself constitutes a starter ring for the flywheel.

The inside or smallest diameter edges of the flanges 12 and 12' have different radii, however; the flange 12 extends a considerable distance towards the axis of the flywheel, whereas the flange 12' stops short of the latter by a considerable distance.

Overlying the inside edge of the flange 12, on the same side of it as the flange 12', is an annular ring member 16 through which the screws 10 pass, these screws also passing through the flange 12 so that the ring member 16 is fastened to the flange 12 by the screws 10.

The part B, or the output part, generally comprises a hub 18 which surrounds the ring member 16 of the part A, there being disposed between it and the latter a bearing 20 and a flange 21 attached to said hub 18 by screws 22 and so constrained to rotate with it.

For the most part the flange 21 lies outside the volume defined by the flanges 12 and 12' of part A and through this flange the damper-type flywheel in accordance with the invention is adapted to serve as a reaction plate for a friction disk (not shown) and so to be frictionally constrained to rotate with the friction disk, while the hub of the friction disk is constrained to rotate with a second shaft which is a driven shaft such as, for example, the input shaft of a gearbox in the case of an automobile vehicle.

The bearing 20 is keyed axially between the flange 21 and a transverse shoulder 23 on the hub 18.

In the axial direction it bears against a transverse shoulder 24 on the ring member 16, on the side opposite the flange 21.

Part B further comprises a flange assembly 25 between the flanges 12 and 12' of part A.

The flange assembly 25 is gripped axially between the hub 18 and the flange 21 and is constrained to rotate with them by the screws 22 linking them.

Circumferentially acting elastic means and friction means are operative between the coaxial parts A and B.

The circumferentially acting spring means comprise five circumferentially acting spring members 27 accommodated in respective housings 28 formed for them in part A, to be more precise in the flanges 12, 12' that the latter comprises, these housings 28 being essentially formed by openings provided for this purpose in the central area of the flange 12 and notches provided for this purpose at the inside edge of the flange 12'.

Notches formed on the inside edge of the annular spacer 14, in corresponding relationship with those formed in the flange 12', also form part of these housings.

The circumferentially acting spring members 27 are helical coil springs extending substantially tangentially to a common circumference of the flywheel; at their circumferential ends they bear on plug or cup members 30 disposed circumferentially between them and the radial edges 31 of the openings 28 in which they are accommodated and which, on the side facing said radial edges 31, feature a respective concave dished surface 32 facing towards the radial edge 31.

On the side opposite the radial edges 31 of the openings 28 the plug members 30 each carry a circumferentially projecting elastic material buffer 33.

Figure 1:
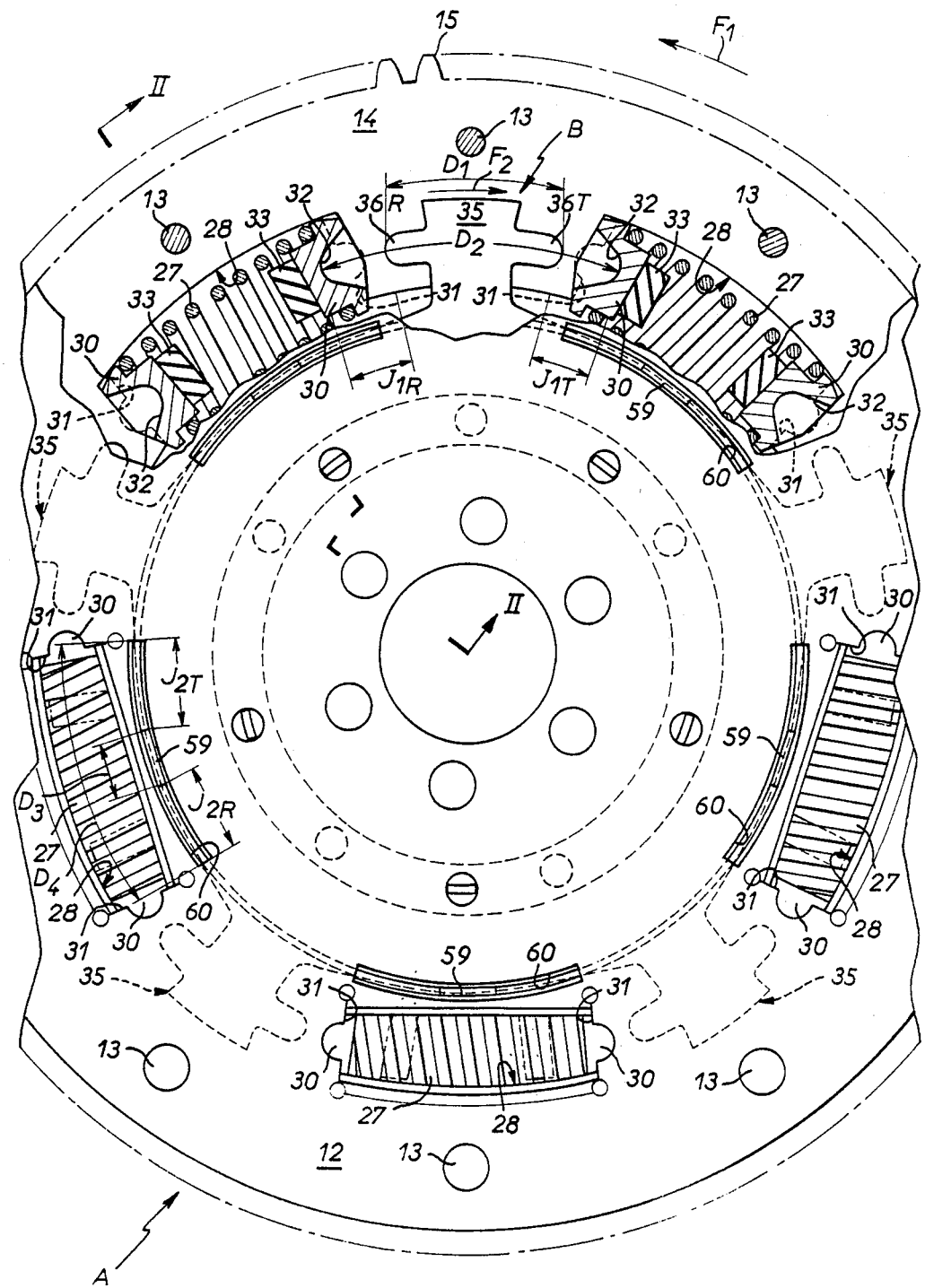
FIG. 1 is a locally cutaway partial view in elevation of a damper-type flywheel in accordance with the invention, as seen in the direction of the arrow I in FIG. 2.

In the inoperative configuration of the flywheel, which is the one shown in FIG. 1, the plug members 30 are in contact with the radial edges 31 of the openings 28, because of the action of the circumferentially acting spring members 27 which extend between them, and these spring members are optionally pre-stressed at this time.

Arms 35 forming part of the flange assembly 25 are adapted to intervene between the circumferentially acting spring members 27, each arm 35 extending radially from the flange assembly, away from the axis of the flywheel, with each arm disposed between two successive circumferentially acting spring members 27.

The arms 35 each feature two dihedral folds that are oppositely oriented so that their active part, through which they are adapted to interfere with the circumferentially acting spring members 27, lies halfway between the flanges 12, 12' of part A, in line with the central part of the circumferentially acting spring members 27.

The arms 35 of the flange assembly 25 each comprise, projecting in opposite circumferential directions relative to each other, two fingers 36T, 36R; the finger 36T extends in the circumferential direction assumed to correspond to so-called "direct drive" operation in which the rotational torque transmitted from one of the coaxial parts A and B to the other is increasing, whereas the finger 36R extends in the opposite circumferential direction, assumed to correspond to so-called "over-run" operation for which the torque is decreasing.

Between the circumferentially acting spring members 27 and the arms 35 there is a circumferential clearance J1 which, in the inoperative configuration of the flywheel, is divided between a clearance J1T on the side of the fingers 36T and a clearance J1R on the side of the fingers 36R, the clearance J1T being measured between the end of a finger 36T and the back of the dished surface 32 of the corresponding plug member 30, whereas the clearance J1R is measured between the end of a finger 36R and the back of the dished surface 32 of the corresponding plug member 30.

The friction means operative between the coaxial parts A and B comprise a friction ring 38 formed by a support ring 39 and a friction facing 40 appropriately attached to the support ring 39, as by adhesive bonding, for example; the friction facing 40 is applied axially against a transverse shoulder 41 on the hub 18 of part B by an axially acting spring washer 42 bearing through the intermediary of a distributor washer 43 on the flange 12 of part A.

The spring washer 42 is of the Belleville washer type.

Axial lugs 45 on the outside edge of the support ring 39 are inserted without clearance in holes 46 provided for them in the flange 12, whereby the friction ring 38 is constrained to rotate with the part A.

Thus by virtue of the friction facing 40 the friction ring 38 is operative between the coaxial parts A and B from the beginning of and throughout relative angular displacement between them.

These arrangements are well known in themselves and as they do not of themselves constitute part of the present invention they will not be described in more detail here.

The friction means operative between the coaxial parts A and B further comprise at least one friction ring 50 disposed axially between the flange assembly 25 of part B and an annular collar 51 which, constrained to rotate with the flange assembly 25, is axially spaced from it and disposed between it and one of the flanges 12, 12' of part A, in this instance the flange 12, there being lost-motion circumferential engagement means between this friction ring 50 and the flange 12. The collar 51 associated with the flange assembly 25 is in one piece with the hub 18 with which the flange assembly 25 is constrained to rotate, extending like the latter radially away from the axis of the flywheel from the hub 18.

The friction ring 15 comprises a support ring 52 and a friction facing 53 appropriately attached to the support ring 52, as by adhesive bonding, for example, and by which it is applied against the flange assembly 25.

As an alternative to this, the friction facing 53 might be free to rotate relative to the ring 52 with which it is associated, in which case the latter would no longer serve as a support ring for it, but rather as a distributor ring.

Between the flange assembly 25 and the collar 51 there are two friction rings, the previously described friction ring 50 and a friction ring 54.

Like the friction ring 50, this second friction ring 54 comprises a support ring 55 and a friction facing 56 which is appropriately attached to the support ring 55, as by adhesive bonding, for example, although as previously it could alternatively be free to rotate, and the friction facing 56 of the friction ring 54 is applied against the collar 51.

In other words the friction rings 50 and 54 are back-to-back with their support rings 52 and 55 facing each other and their friction facings 53 and 56 facing away from each other. Axially acting spring means are provided between the friction rings 50 and 54 to press one of them against the flange assembly 25 and the other against the collar 51.

The axially acting spring means comprise a Belleville washer type spring washer 58.

The lost-motion circumferential engagement means provided between the friction ring 50 and the flange 12 of part A comprise at least one axial lug 59, with which the friction ring 50 is constrained to rotate, and an opening 60 formed in the flange 12 into which the axial lug 29 is inserted with clearance.

The axial lug 59 is in one piece with the support ring 52 of the friction ring 50, extending away from the outside edge thereof, and the friction ring 54, to be more precise its support ring 55, has at its outside edge at least one notch 61 in which is engaged, without clearance, a respective axial lug 59 of this kind.

In this way, the friction rings 50 and 54 are constrained to rotate together.

Each opening 60 in the flange 12 for receiving an axial lug 59 of the friction ring 50 is a circumferentially elongate slot.

There are five axial lugs 59 circumferentially distributed on the friction ring 50 and five openings 60 in the flange 12 and these openings, each of which is in the shape of a circular arc are radially aligned with respective housings 28 of the circumferentially acting spring members 27, on a circumference of smaller diameter than that on which the housings 28 are disposed.

J2 designates the circumferential clearance of the lost-motion circumferential engagement means provided in this way between the friction ring 50, and thus the assembly that it forms together with the friction ring 54, on the one hand, and the flange 12 of part A, on the other hand.

In the inoperative configuration of the flywheel the circuferential clearance J2 is normally divided between a clearance J2T on the side of the axial lugs 59 of the friction ring 50 corresponding to "direct drive" operation and a clearance J2R on the opposite side, corresponding to "overrun" operation.

The circumferential clearance J2 is preferably at least equal to the clearance provided between the circumferentially acting spring members 27 and the arms 35 of the flange assembly 25 so that, as described hereinafter, during relative angular displacement between the coaxial parts A and B, irrespective of the direction in which this occurs, the friction rings 50 and 54 are operative at the earliest simultaneously with the circumferentially acting spring members 27.

In other words, if:

D1 designates the circumferential distance between the ends of the fingers 36T, 36R of an arm 35, D2 designates the circumferential distance between the backs 32 of the plug members 30 embracing each arm 35, D3 designates the circumferential distance between the axial edge surfaces of a lug 59 of the friction ring 50, and D4 designates the circumferential distance between the circumferential ends of the openings 60 in the flange 12, then the following relationship preferably governs the distances D1, D2, D3 and D4:

$$(D4-D3)>(D2-D1)$$

Assuming that in so-called "direct drive" operation the flywheel rotates about its axis in the circumferential direction shown by the arrow F1 in FIG. 1, there is relative angular displacement between the coaxial parts A and B of the damper-type flywheel and everything proceeds as if, as shown by the arrow F2, part B were moving angularly relative to part A in the circumferential direction opposite that shown by the aforementioned arrow F1.

During a first phase which corresponds to relatively low values of the corresponding angular relative movement, only the friction ring 38 is operative, parts A and B slipping relative to each other at the level of the friction ring 40.

On the other hand, the friction rings 50, 54 are inoperative, being constrained to rotate with part B by their friction facings 53, 56.

This first phase continues until, the circumferential clearance J1T having been absorbed, fingers 36T on the arms 35 of the flange assembly 25 of coaxial part B come into contact with the bottom of the dished surface 32 of the corresponding plug members 30 immediately downstream of the arms 35 in the circumferential direction concerned.

As relative angular movement between the coaxial parts A and B continues, the circumferentially acting spring members 27 are compressed in the circumferential direction.

This second phase continues until part B is positively driven by part A as a result of the elastic material buffers 33 coming into contact with each other and possibly being compressed.

During this second phase, or as soon as it begins, the circumferential clearance J2T is absorbed and the axial lugs 59 on the friction ring 50 abut circumferentially against the corresponding circumferential ends of the openings 60 in the flange 12.

Once this happens, the friction rings 50 and 54, which were previously linked rotationally to part B by virtue of friction due to their friction facings 53 and 56, are constrained to rotate with part A by the axial lugs 59; this results in the development of a friction torque between them and part B with which they are in contact, or in other words between the coaxial parts A and B.

The design value of this friction torque is lower than the motor torque but sufficiently high to be able to absorb any excess torque.

The previously described two phases of operation correspond to an increasing torque transmitted from one of the coaxial parts A and B to the other, as is the case when the accelerator of the vehicle concerned is operated in this way, for example. If this action is terminated, the torque transmitted from one of the coaxial parts A and B to the other decreases and a process which is the reverse of that just described occurs, for so-called "overrun" operation.

In the inoperative condition the arms 35 of the flange assembly 25 can occupy any position between the circumferentially acting spring members 27 and, similarly, the axial lugs 59 of the friction rings 50 and 54 can occupy any position between the circumferential ends of the openings 60 in the flange 12.

As the friction rings 50 and 54 are free to slide along the axis of the flywheel they are advantageously operative without there being any concommitant compression of any of the circumferentially acting spring members 27, which are able subsequently to release the energy stored in them during such compression, so that momentary unilateral angular displacements of the friction rings 50 and 54 for one direction of relative angular displacement between the coaxial parts A and B concerned does not necessarily entail them being returned by spring force to their initial position when the direction of such relative angular displacement is reversed. On the contrary, the instantaneous position of the friction rings 50 and 54 depends of previous operating conditions, so that they can occupy any position.

However, experience has shown that after operation under stable conditions, that is to say after a number of circumferential oscillations of the two coaxial parts A and B concerned relative to each other, the lugs 59 of the friction rings 50 and 54 occupy, between the circumferential ends of the openings 60 in which they are inserted, a position which reflects that of the arms 35 of the flange assembly 25 relative to the circumferentially acting spring members 27.

Because of this, and because the circumferential clearance J2 is at least equal to the circumferential clearance J1, under stable conditions the friction rings 50 and 54 do not become operative before the circumferentially acting spring members 27 and the torque due to the friction rings 50 and 54 is not capable of overriding that due to the friction ring 38 alone.

It is to be understood that the present invention is not limited to the embodiment described and shown but encompasses any variant execution.

Specifically, a single friction ring could be operative between the flange assembly of one of the coaxial parts concerned and a flange constrained to rotate with this flange assembly, and/or the axial lug provided between a friction ring of this kind and a flange on the other of said coaxial parts could originate from this flange rather than this friction ring.

There is claimed:

1. A damper type flywheel comprising first and second coaxial flywheel parts mounted for angular displacement relative to each other, said first flywheel part including two axially spaced annular flanges and said second flywheel part having a flange assembly fixed for rotation therewith and disposed axially between said flanges of said first flywheel part, circumferentially acting spring means and friction means operably disposed between said first and second flywheel parts, said friction means including an annular collar fixed for rotation with said flange assembly and at least one friction ring operably disposed axially between said flange assembly and said annular collar, and lost motion circumferentially engagement means operative between said friction ring and one of said annular flanges of said first flywheel part.

2. Flywheel according to claim 1, wherein said engagement means comprise at least one axial lug with which said friction ring is constrained to rotate and an opening in said one of said annular flanges of said first flywheel part in which said axial lug is inserted with clearance.

3. Flywheel according to claim 2, wherein said opening is a circumferentially elongate slot.

4. Flywheel according to claim 1, wherein said at least one friction ring comprises two friction rings between said flange assembly and said annular collar constrained to rotate with each other and axially acting spring means disposed between said two friction rings, said axially acting spring means urging one of said friction rings towards said annular collar and one other of said friction rings towards said flange assembly.

5. A flywheel according to claim 4, wherein one of said friction rings is axially movable relative to the other of the friction rings.

6. Flywheel according to claim 4, wherein said engagement means comprise at least one axial lug extending from one outer peripheral edge of one of said friction rings and an opening in said one of said annular flanges of said first flywheel part in which said axial lug is inserted with clearance and the other of said friction rings has on its outer peripheral edge at least one notch in which said at least one axial lug is received without clearance.

7. A flywheel according to claim 6, wherein one of said friction rings is axially movable relative to the other of the friction rings.

8. Flywheel according to claim 1, wherein said circumferentially acting spring means between said first and second flywheel parts comprise circumferentially acting spring members, respective housings for said spring members in said first flywheel part, and arms on said flange assembly adapted to cooperate with said spring members with circumferential clearance between said arms and said spring members, and wherein said lost-motion engagement means provides between one of said annular flanges of said first flywheel part and said friction ring disposed between said flange assembly and said annular collar a circumferential clearance that is at least equal to said circumferential clearance between said arms and said spring members.

9. A flywheel according to claim 1, wherein axially acting spring means urge said friction ring against one of said annular collar and said flange assembly.

10. A flywheel according to claim 1, wherein said friction means is disposed entirely radially inwardly of said circumferentially acting elastic means.

11. A flywheel according to claim 1, wherein said circumferentially acting spring means comprising circumferentially acting springs each received in an individual housing defined by said annular flanges of said first coaxial part, said engagement means comprising at least one axial lug fixed to said friction ring and an opening therefor in said one of said annular flanges of said first coaxial part, said opening being disposed radially inwardly and in alignment with one of a corresponding individual housing.

* * * * *